US012541332B2

(12) United States Patent
Morales et al.

(10) Patent No.: US 12,541,332 B2
(45) Date of Patent: Feb. 3, 2026

(54) METHODS FOR INTEGRATED RESOURCE MANAGEMENT IN A PRINTING SYSTEM

(71) Applicant: Kyocera Document Solutions Inc., Osaka (JP)

(72) Inventors: Javier A. Morales, Rochester, NY (US); Michelle De Beus, Redondo Beach, CA (US); Timothy S. Geesman, Los Angeles, CA (US)

(73) Assignee: Kyocera Document Solutions Inc., Osaka (JP)

( * ) Notice: Subject to any disclaimer, the term of this patent is extended or adjusted under 35 U.S.C. 154(b) by 258 days.

(21) Appl. No.: 18/529,412

(22) Filed: Dec. 5, 2023

(65) Prior Publication Data

US 2025/0181290 A1 Jun. 5, 2025

(51) Int. Cl.
*H04N 1/04* (2006.01)
*G06F 3/12* (2006.01)

(52) U.S. Cl.
CPC .......... *G06F 3/1256* (2013.01); *G06F 3/1238* (2013.01); *G06F 3/1258* (2013.01); *G06F 3/1265* (2013.01)

(58) Field of Classification Search
None
See application file for complete search history.

(56) References Cited

U.S. PATENT DOCUMENTS 12,159,069 B1 * 12/2024 Morales ................ G06F 3/1208

* cited by examiner

*Primary Examiner* — Cheukfan Lee
(74) *Attorney, Agent, or Firm* — Millen, White, Zelano & Branigan P.C.; William F. Nixon

(57) ABSTRACT

Methods for aggregating resources enhance the export or import of printing resources within a printing system. A resource is selected for a paper. The resource can be a paper catalog entry, a calibration, an ICC profile, or a spot color associated with a paper. One or more calibrations associated with the resource are determined. Peer calibration groups are aggregated based on calibrations sharing the same calibration source data. The resources and groups are displayed so that an operator selects which resources to export or import within the printing system.

20 Claims, 10 Drawing Sheets

FIG. 5A

| | Attributes | |
|---|---|---|
| 504 — | Name | First Paper — 506 |
| 508 — | External ID | 62e26558-a3e9 — 510 |
| 512 — | Brand | Big Print Color Copy — 514 |
| 516 — | Size | A4 (210 x 297 mm) — 518 |
| 520 — | Feed Direction | Long Edge — 522 |
| 524 — | Weight | 170 gsm — 526 |
| 528 — | Grain | Long — 530 |
| 532 — | Type | Plain — 534 |
| 536 — | Set Count | 1 — 538 |
| 540 — | Color | White — 542 |
| 544 — | Front Coating | Inkjet — 546 |
| 548 — | Back Coating | Inkjet — 550 |
| 552 — | Texture | Smooth — 554 |
| 556 — | Preprinted | No — 558 |
| 560 — | Paper Group Name | Coated Glossy — 562 |

| | Paper Group Attributes | |
|---|---|---|
| 570 | | |
| 560 | Paper Group Name | Coated Glossy | 562
| 512 | Brand | Big Print Color Copy | 514
| 532 | Type | Plain | 534
| 536 | Set Count | 1 | 538
| 540 | Color | White | 542
| 544 | Front Coating | Inkjet | 546
| 548 | Back Coating | Inkjet | 550
| 552 | Texture | Smooth | 554
| 556 | Preprinted | No | 558

FIG. 5B

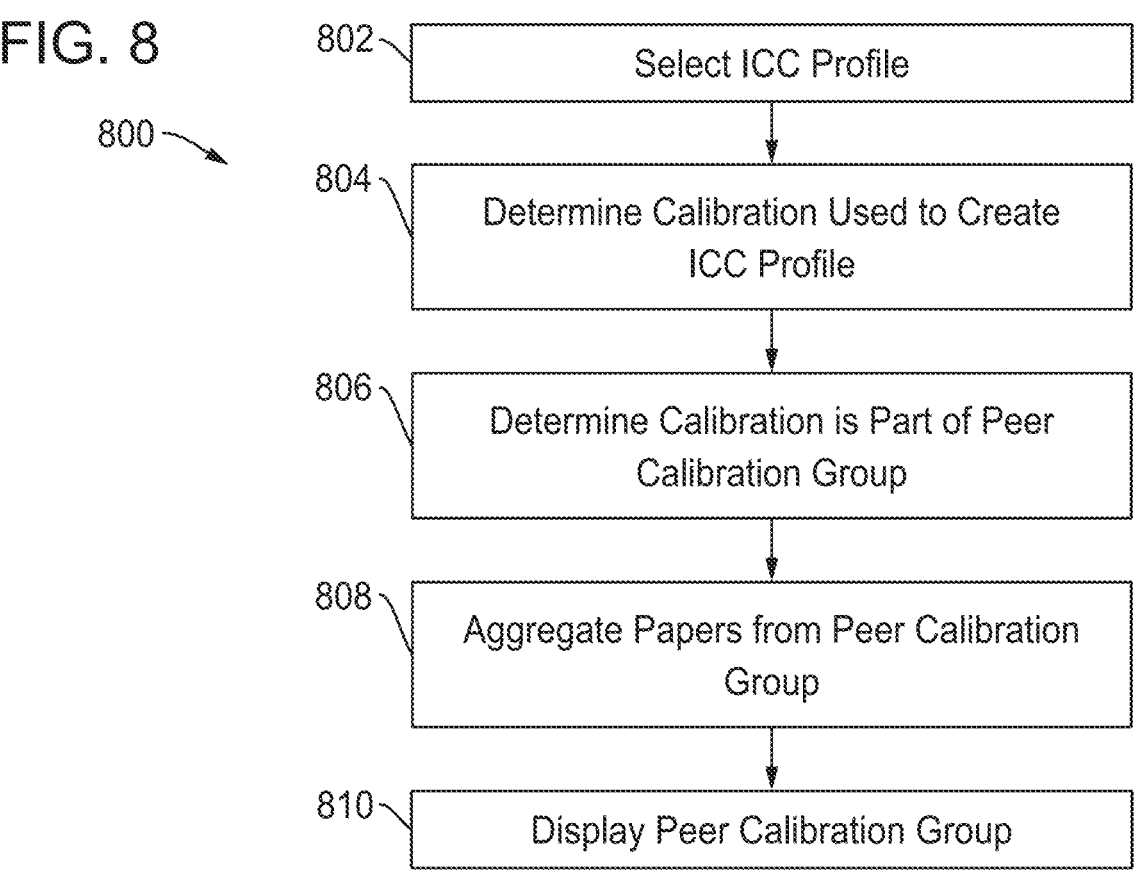

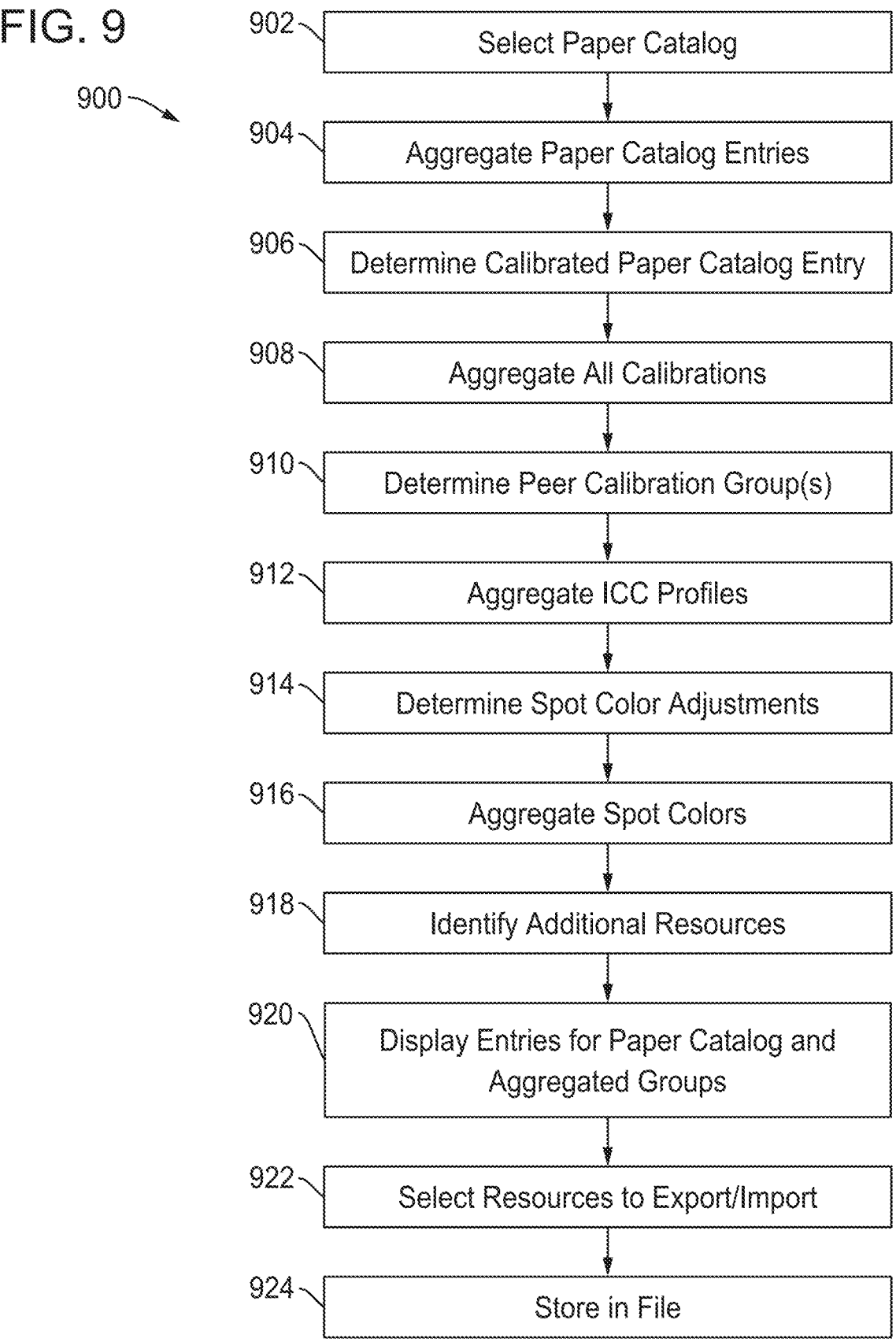

METHODS FOR INTEGRATED RESOURCE MANAGEMENT IN A PRINTING SYSTEM

FIELD OF THE INVENTION

The present invention relates to a printing device or system for managing printing operations using integrated resource management for the exporting and importing of groups of papers.

DESCRIPTION OF THE RELATED ART

Accurate color reproduction for production printing requires the use of multiple resources of a digital front end (DFE) of a printing device. These DFE resources include paper catalog entries, calibrations, ICC profiles, and spot color definitions. These resources work in concert with each other to enable the expected color reproduction. Management of these resources and their associations is a complex process that requires time, care, and, most importantly, expertise.

SUMMARY OF THE INVENTION

A method for managing color printing resources is disclosed. The method includes selecting a resource of an identified paper within a paper catalog. The method also includes aggregating a set of papers within the paper catalog for the printing device based on a shared attribute of the identified paper. The method also includes displaying a list including the set of papers along with the shared attribute. The method also includes selecting the set of papers from the list to export from or import to the printing device.

A method for managing color printing resources in a printing system is disclosed. The method also includes selecting a resource for color printing at a printing device. The method also includes aggregating a set of papers within the paper catalog for the printing device based on a shared attribute of the resource. The method also includes determining a first calibration associated with the set of papers along with a paper catalog entry used to create the first calibration. The method also includes generating a first peer calibration group based on papers within the set of papers using the first calibration. The method also includes displaying the first peer calibration group including the papers using the first calibration. The method also includes selecting the first peer calibration group for export from or import to the printing device.

A method for exporting color printing resources for a set of papers is disclosed. The method includes selecting a first calibration to export. The first calibration corresponds to a paper within a paper catalog for a printing device. The method also includes aggregating a set of papers within the paper catalog for the printing device based on a shared attribute of the paper corresponding to the first calibration. The method also includes generating a first peer calibration group based on the papers within the set of papers having the shared attribute. The method also includes determining an ICC profile associated with the first calibration. The method also includes determining a spot color adjustment associated with the first calibration. The method also includes displaying the first peer calibration group, the ICC profile, the spot color adjustment, and the first calibration. The method also includes selecting at least one resource to export from the first peer calibration group.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, numerous variations are possible. For instance, structural elements and process steps may be rearranged, combined, distributed, eliminated, or otherwise changed, while remaining with the scope of the disclosed embodiments.

BRIEF DESCRIPTION OF THE DRAWINGS

Various other features and attendant advantages of the present invention will be more fully appreciated when considered in conjunction with the accompanying drawings.

FIG. 5A illustrates an example listing of attributes for a specific paper, or the first paper, according to the disclosed embodiments.

FIG. 5B illustrates an example listing of paper group attributes for a set of papers generated according to the disclosed embodiments.

FIG. 8 illustrates a flowchart for aggregating related resources based on an ICC profile according to the disclosed embodiments.

FIG. 9 illustrates a flowchart for aggregating resources according to the disclosed embodiments.

DETAILED DESCRIPTION OF THE PREFERRED EMBODIMENTS

Figure 1A:
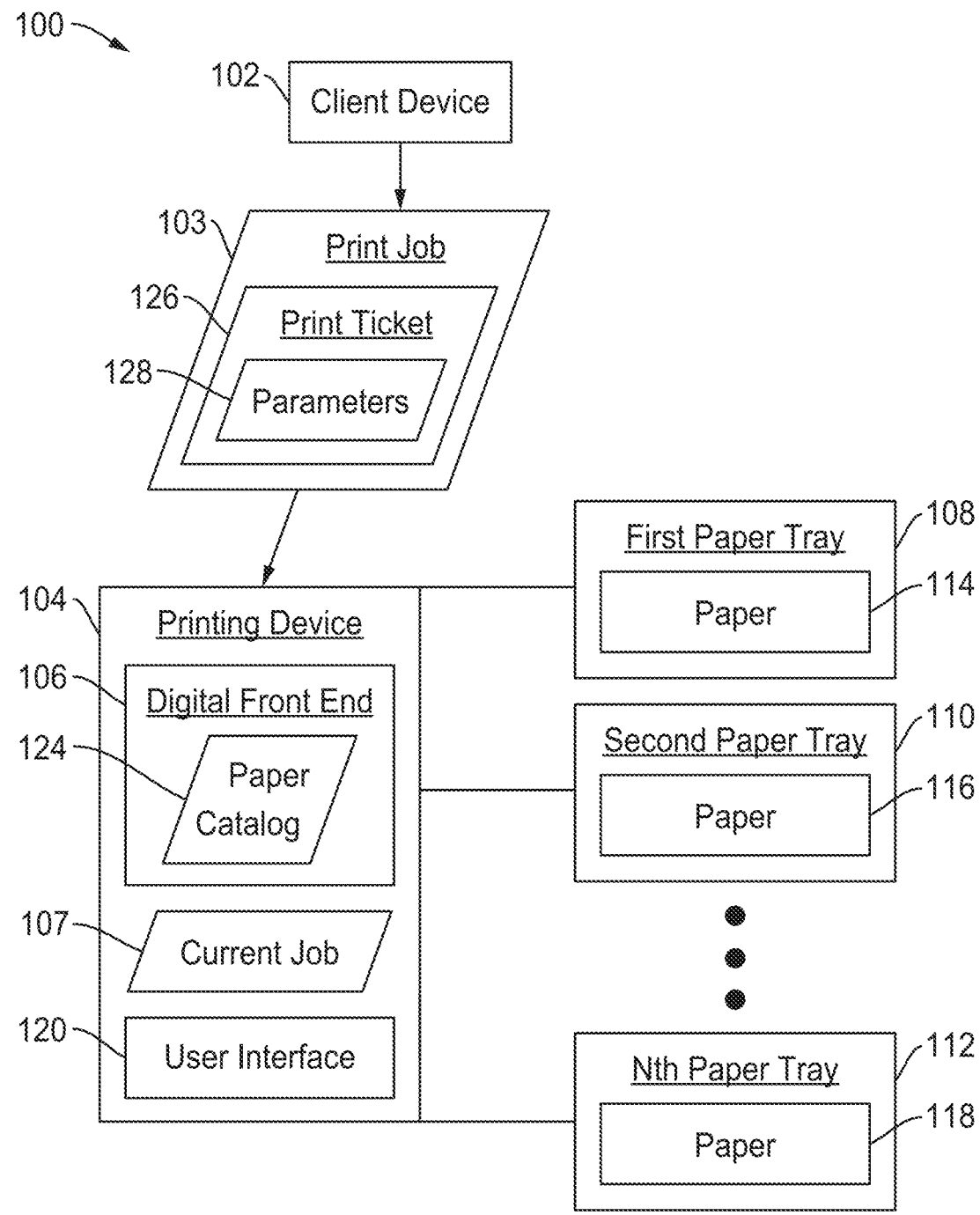
FIG. 1A illustrates a printing system having a printing device for printing documents according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments enable export and import of integrated resources. Specifically, the disclosed embodiments provide a system that enhances the export or import functionality to ensure that when a resource is exported all linked resources also are exported. The disclosed embodiments enable simple and complete export and import of resources. Operators do not need to manage the correlation between resources as this feature is managed by the system.

When the operator chooses to export resources of a given type, the disclosed embodiments may perform the following actions. Within the resource type, the disclosed embodiments may determine if there is any aggregation that makes sense. For paper catalogs, the disclosed embodiments may mirror the aggregation used to manage papers and display only aggregated papers for the operator to export or import. These are the papers that use the same values for attributes that impact color reproduction.

For calibrations, the disclosed embodiments may mirror the aggregation used to manager calibrations and display a single entry for each "peer calibration" group. Peer calibration groups use calibrations that share the same source calibration data. These calibrations are printed using the same values for attributes that affect calibration curves, such as media and halftones. For ICC profiles and spot colors, the disclosed embodiments may mirror aggregation used to manage spot colors and ICC profiles, and displayed aggregated spot color definitions.

Once the operator selects the resource type that he or she would like to import, the disclosed embodiments may look for related resources. These resources may include paper catalog entries, calibrations, ICC profiles, and spot colors. For paper catalog entries, the disclosed embodiments may look for any calibrations that are associated with the selected paper. The disclosed embodiments may display these calibrations with the paper catalog entries allowing operators to see which calibrations will be exported or imported along with the paper definitions.

For calibrations, the disclosed embodiments may look for the paper catalog entry that was used to create the calibration. The disclosed embodiments then may determine which papers should be aggregated together with the calibrated paper and display those as an aggregated entry to the operator. The disclosed embodiments may look for ICC profiles that are associated with the calibration and display those to the operator. The disclosed embodiments also may look for spot color adjustments that are associated with the selected calibration. The disclosed embodiments may determine which base spot color definition and spot color aliases should be aggregated together with the spot color adjustment definition to display these as an aggregated entry to the operator.

For ICC profiles, the disclosed embodiments may look for the calibration that was used to create the ICC profile. The disclosed embodiments then may determine which calibrations are part of a "peer calibration" group and display those as an aggregated entry to the operator. For spot colors, the disclosed embodiments may look for spot color aliases and spot color adjustments that are associated with the selected spot color. The disclosed embodiments may display those to the operator as an aggregated entry.

The disclosed embodiments also may crawl through resources to provide the operator with a complete set of resources. For example, if the operator exports the paper catalog, the disclosed embodiments may display multiple paper catalog entries as a single aggregated entry. The disclosed embodiments then may determine if any of the aggregated entries have been calibrated. If a paper catalog entry has been calibrated, then the disclosed embodiments will aggregate all of the calibrations for the paper catalog entry. There may be multiple peer calibration groups for a given paper catalog entry.

The disclosed embodiments then may determine if an ICC profile has been created for any of the calibrations. If so, then the disclosed embodiments may display the ICC profiles. The disclosed embodiments also may determine if there are any spot color adjustments associated with any of the selected calibrations. If so, then the disclosed embodiments may display the base spot color definition and spot color aliases associated with the spot color adjustment. The disclosed embodiments optionally may export spot color adjustments that are associated with paper catalog entries other than the selected paper catalog entry. If those adjustments are exported then the disclosed embodiments will crawl back through resources and display those additional calibrations, paper catalog entries, and ICC profiles.

In another example, if the operator exports calibrations, then the disclosed embodiments may crawl through resources in a similar manner as above. In this example, however, the source resources will be calibrations. The disclosed embodiments then may display the following information: aggregated paper catalog entries, ICC profiles, and spot colors with adjustments for the selected calibration.

The operator then may choose which resources to export. The disclosed embodiments may automatically export all linked resources. Alternatively, the operator may be given the option to not export the linked resources. Once the operator selects resources to export, the resources may be stored in a file that can be imported at a later time. During import, the disclosed embodiments may display the same resources to the operators.

When resources are imported, the disclosed embodiments may import resources based on dependencies in order to ensure all dependent resources are imported. The disclosed embodiments may provide import status for all resource types. Operators optionally may be given the option to choose which resources to import into the printing system. This feature may be either at the top level or at every level of the resource tree. Imported resources may retain the original associations to ensure these resources are sued in the same manner in the printing system in which they are imported into as opposed to the original printing system.

FIG. 1A depicts a printing system 100 for printing documents according to the disclosed embodiments. Printing system 100 includes printing device 104. Printing device 104 is disclosed in greater detail below. Printing device 104 may receive one or more print jobs 103 within printing system 100. For example, client device 102 may generate and send print job 103 to printing device 104. In some embodiments, printing device 104 may be a production printing device in that print jobs are provided through client device 102, which is attached to the printing device. Such a print job may require 1000s of pages or even 100,000 pages or more.

Print job 103 may include a print ticket 126 that sets forth one or more parameters 128 for the print job. For example, print ticket 126 may specify a size for a sheet of print job 103 as well as weight, quality of paper, color of paper, punched holes, and the like. The operator may generate print ticket 126 when submitting print job 103 for printing within printing system 100. Information from print ticket 126, such as one or more parameters 128, may be used to generate a list of recommended papers to display for print job 103.

Printing device 104 may receive print job 103 as it is processing and printing current job 107. Current job 107 may use different paper or media than print job 103. As such, printing device 104 may include a plurality of paper trays to supply papers of various types, sizes, weights, and the like. Thus, printing device 104 includes first paper tray 108 having paper 114, second paper tray 110 having paper 116, and so on to Nth paper tray 112 having paper 118. Current job 107 may use paper from one or more of these paper trays. In some embodiments, paper 114, paper 116, and paper 118 are different types of paper or different media. For example, current job 107 may use paper 116 from second paper tray 110 while print job 103 may require paper 114 from first paper tray 108.

User interface 120 may be in operation panel 208, disclosed below, or part of digital front end (DFE) 106. DFE 106 is disclosed in greater detail below. DFE 106 may process print jobs and act as a controller for printing device 104. Alternatively, user interface 120 may be displayed on client device 102. The disclosed embodiments may use user interface 120 to select papers for print job 103.

DFE 106 also includes paper catalog 124. Paper catalog 124 is configured to organize and store existing calibration data and ICC profiles for a plurality of papers. Upon selection of a paper for printing at printing device, paper catalog 124 may be accessed to complete print job 103 according to the expectations associated with the print job. Paper catalog 124 is disclosed in greater detail below by FIG. 3. In some embodiments, DFE 106 may include multiple paper catalogs. Further, paper catalog 124 also may be stored in another component within printing system 100 and accessible by DFE 106.

Figure 1B:
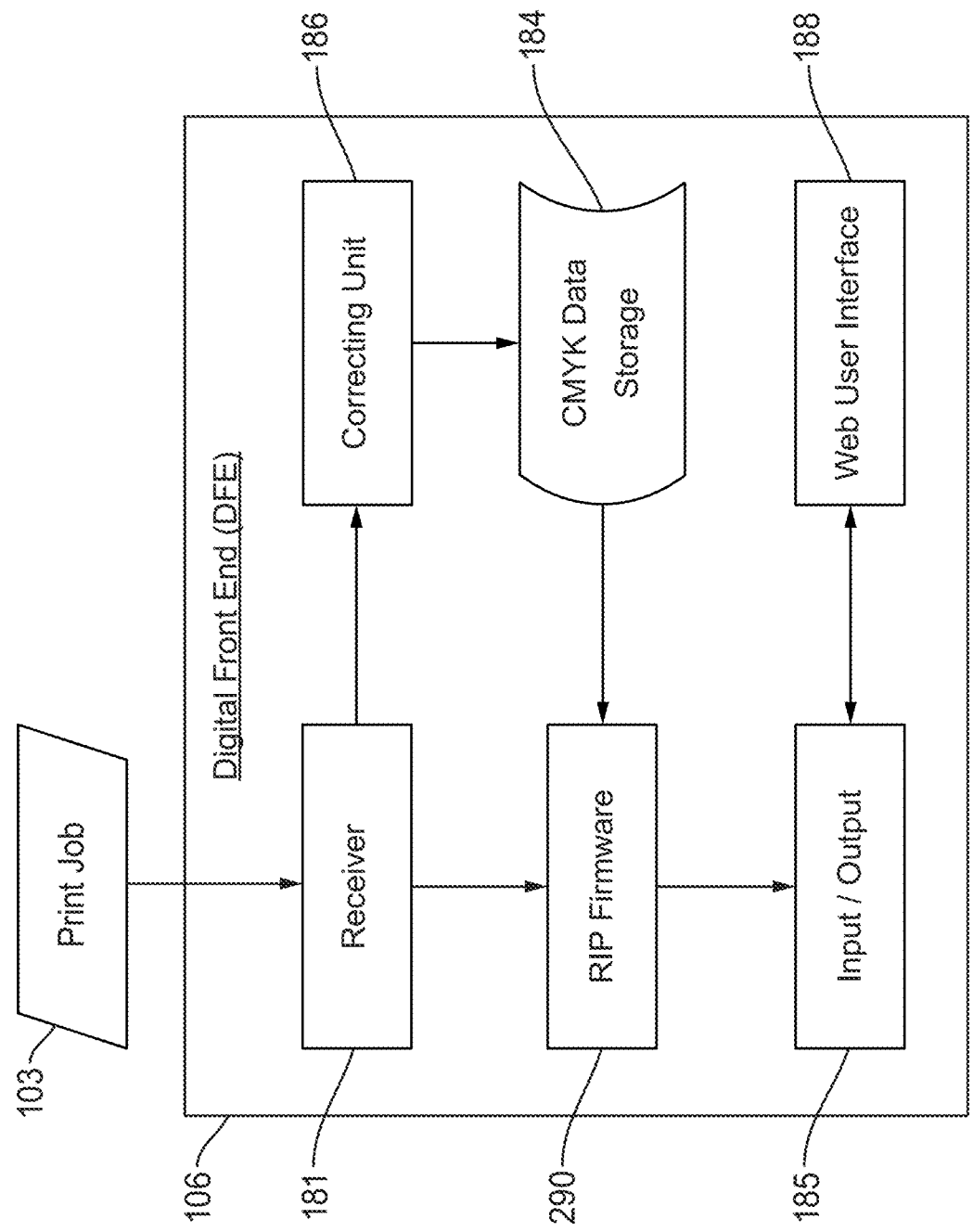
FIG. 1B illustrates a digital front end (DFE) for a printing device according to the disclosed embodiments.

FIG. 1B depicts a block diagram of DFE 106 according to the disclosed embodiments. DFE 106 includes a receiver 181, a RIP firmware 290, a CMYK data storage 184, an input/output connector 185, and a correcting unit 186. Additional components within DFE 106 may be implemented, as disclosed above and below.

Receiver 181 receives print job 103 received within system 100 and outputs the print job to RIP firmware 290. Receiver 181 also may receive color information for the document or documents within the print job. It may output the color information to correcting unit 186. The print job received by receiver 181 is associated with image data to be printed on print media. It also may include print condition information including information for indicating single-sided printing or two-sided printing or print medium-type information along with other data associated with the print job.

RIP firmware 290 converts image data associated with the print job into raster data to thereby generate rendering data, and outputs the generated rendering data. RIP firmware 290 also converts the rendering data into rendering data in a CMYK format. When the rendering data is originally in the CMYK format, or CMYK rendering data, the conversion may not be performed. RIP firmware 290 may perform gradation conversion of the CMYK rendering data, with reference to one or more tone reproduction curves (TRCs). A TRC refers to data indicating the relationship between a colored gradation value for rendering data and print color, or print density, on a given print medium.

When print color provided alters over time, the TRCs stored in CMYK data storage 184 may be each deviated from an actually measured relationship between a colored value and print color. When the TRC is shifted from the actual relationship, gradation conversion for each colored gradation value cannot match a desired print color. In this regard, correcting unit 186 corrects the deviation, from the actual relationship, of the TRC stored in CMYK data storage 184 in order to allow each colored gradation value to match a desired print color. Correcting unit 186 converts RGB color information obtained through receiver 181 into CMYK color information. Correcting unit 186 may use the converted CMYK color information to generate the TRC. The TRC stored in CMYK data storage 184 is replaced with the generated TRC. Correcting unit 186 may correct the TRC. Correcting unit 186 may rewrite a part of the TRC stored in CMYK data storage 184 to thereby correct the TRC.

The rendering data generated by RIP firmware 290 may be transmitted within printing system 100 via input/output connector 185. The print condition information and the print medium type, as well as the rendering data, may be transmitted to a selected printing device within printing system 100. As disclosed above, the rendered data may be in a file format acceptable for a printing device such that the print job is provided directly to the print engine of the printing device.

DFE 106 also includes web user interface 188 that may communicate with other devices within printing system 100, if it is located at a separate device, using, for example, input/output connector 185. Web user interface 188, or web application, allows a user of the DFEs of other printing devices to interact with content or software running on DFE 106.

Figure 2:
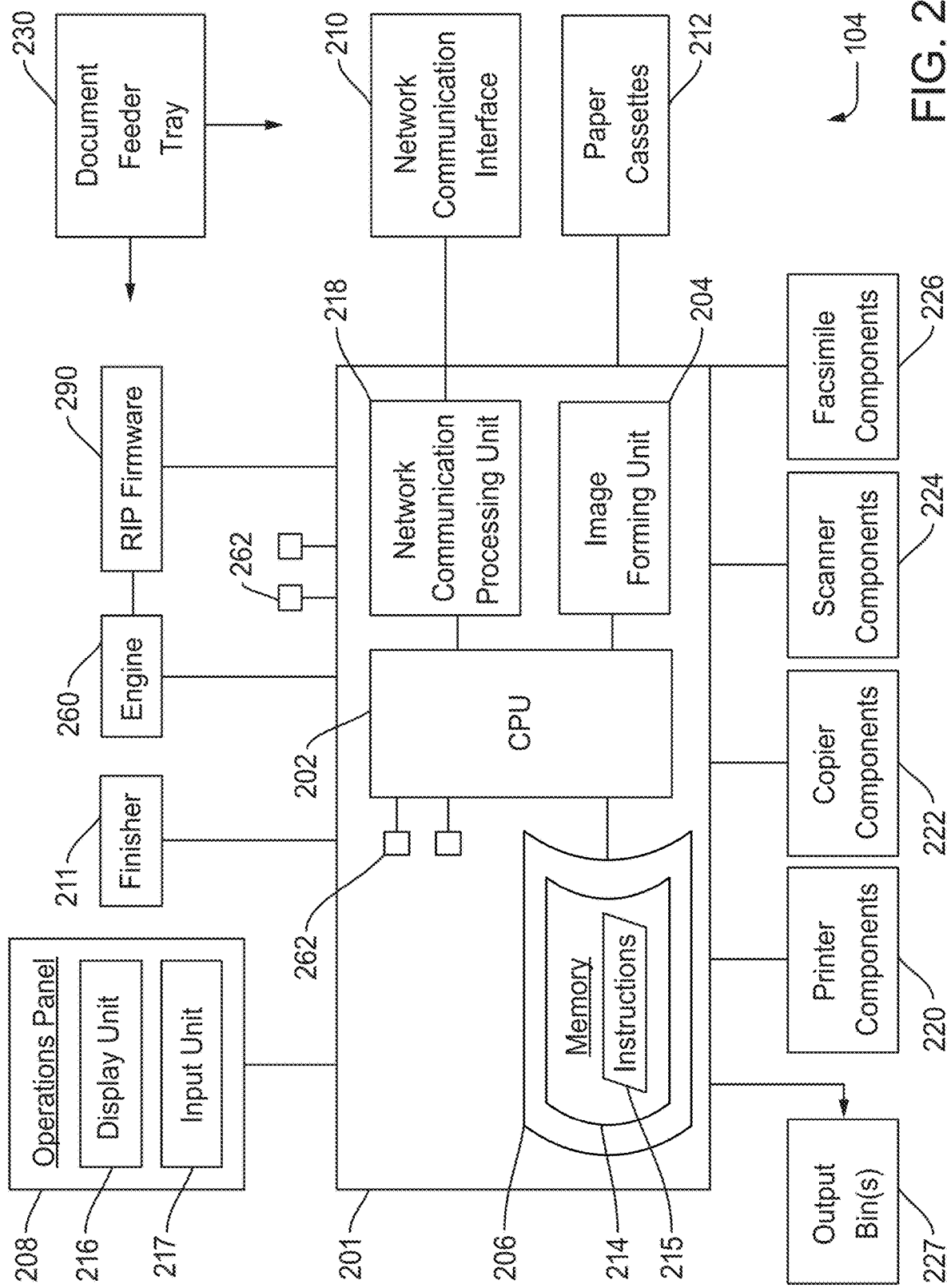
FIG. 2 illustrates a block diagram of components of the printing device for use within the printing system according to the disclosed embodiments.

FIG. 2 depicts a block diagram of components of printing device 104 according to the disclosed embodiments. The architecture shown in FIG. 2 may apply to any multifunctional printing device or image forming apparatus that performs various functions, such as printing, scanning, storing, copying, and the like within system 100. As disclosed above, printing device 104 may send and receive data from DFE 106 and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like.

Paper cassettes 212 supply paper to various components 220, 222, 224, and 226 to create the image formed surfaces on the papers. Paper cassettes 212 also may be known as paper trays, shown as paper trays 108, 110, and 112 in FIG. 1A. Paper cassettes 212 may include papers having various sizes, colors, composition, and the like. Papers or media within paper cassettes 212 may be considered "loaded" onto printing device 104. The information for printing these papers may be captured in a paper catalog stored at DFE 106. Paper cassettes 212 may be removed to refill as needed. The printed papers from components 220, 222, 224, and 226 are placed within one or more output bins 227. One or more output bins 227 may have an associated capacity to receive finished print jobs before it must be emptied or printing paused. The output bins may include one or more output trays.

Document processor input feeder tray 230 may include the physical components of printing device 104 to receive papers and documents to be processed. Feeder tray also may refer to one or more input trays for printing device 104. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 224. As shown in FIG. 2, document processor input feeder tray 230 may interact with print engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Display unit 216 also may serve as to display results from DFE 106, if applicable. DFE 106 may send calibration and paper catalog information to printing device 104 for display. For example, the operator at DFE 106 may send a calibration to printing device 104. Printing device 104 displays paper type and any other information needed to complete the calibration.

Printing device 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes print engine 260, as disclosed above. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of ink or toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the ink onto paper during operations on printing device 104.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device. Memory unit 206 may store the history of failure events and occurred errors with a timestamp of each error.

Printing device 104 communicates with other devices within system 100 via network communication interface 210 by utilizing a network protocol, such as the ones listed above. In some embodiments, printing device 104 communicates with other devices within system 100 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from DFE 106 as well as other devices within system 100.

Figure 3:
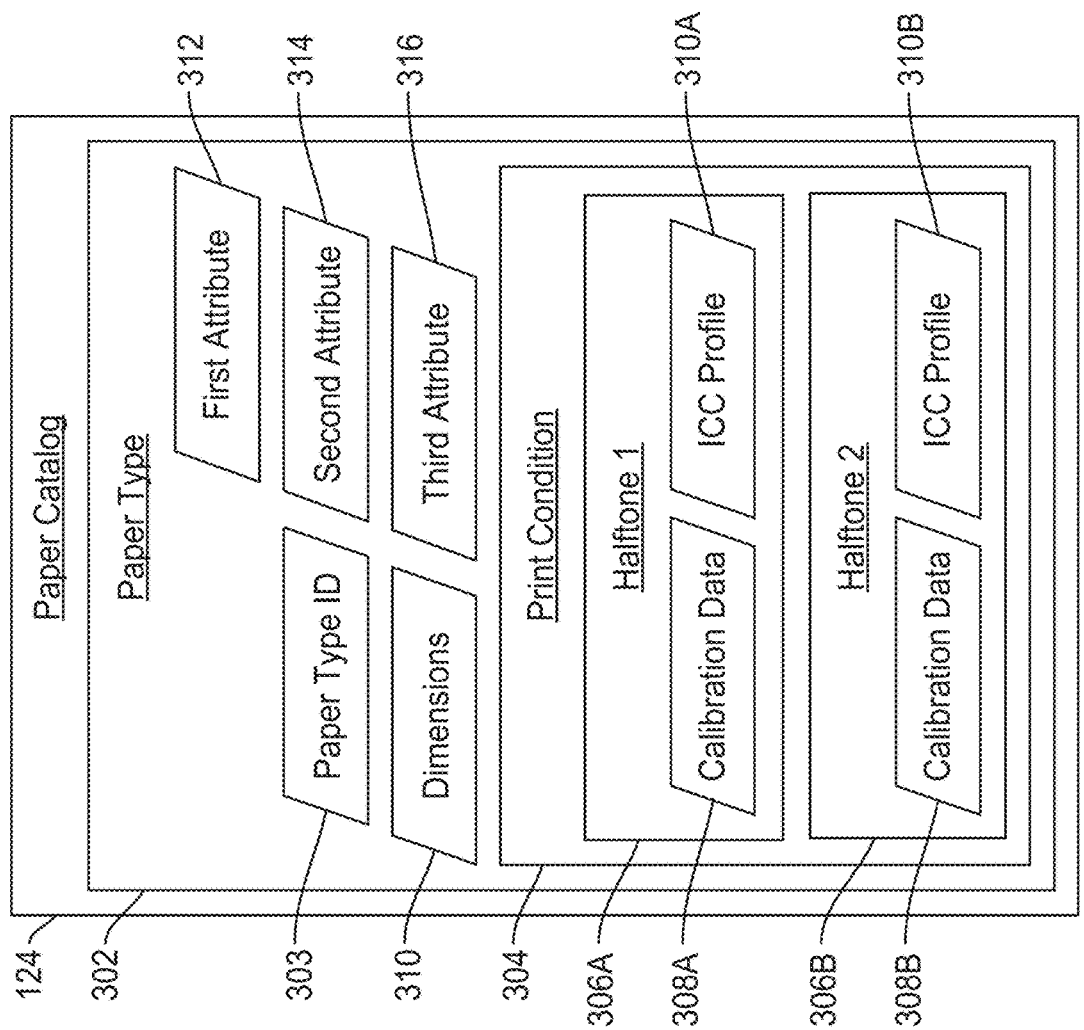
FIG. 3 illustrates a block diagram of a paper catalog for use within the printing system according to the disclosed embodiments.

FIG. 3 depicts a block diagram of paper catalog 124 for use within printing system 100 according to the disclosed embodiments. As disclosed above, paper catalog 124 may reside within DFE 106 of printing device 104. In other embodiments, paper catalog 124 may reside in another component within printing system 100, such as client device 102 or an external server. For brevity, paper catalog 124 is disclosed below as residing within DFE 106.

For each paper type used for a particular model of printing device 104, there are a set of items that work together to achieve optimal reproduction capabilities. These items may be represented in paper catalog 124. An example of an entry in paper catalog for a paper type 302 may be shown. Paper catalog may include hundreds or thousands of such entries. Paper type 302 may be identified within paper catalog 124 by paper type identification 303. In some embodiments, paper type identification 303 may be a unique symbol or code that identifies paper type 302 within paper groups, disclosed in greater detail below.

Paper type 302 includes print conditions. Print conditions may be applied to print jobs using paper type 302. Examples of print conditions may be high quality, default, ink saving, and the like. Each print condition may include its own color printing resources, such as calibration data and ICC profiles. Application of a print condition results in a different result for a print job using paper type 302 at printing device 104. For example, a high quality print condition will differ in some fashion as a finished, printed document from one printed using the default print condition.

As shown in FIG. 3, paper type 302 may include print condition 304. It also may include additional print conditions. Print condition 304 may relate to the high quality print condition for printing paper type 302 at printing device 104. Within print condition, halftones, or halftone designs, may be defined. Printing device 104 may have one or more halftones. Halftones are binary on/off dot patterns of each ink to mimic continuously varying transitions. One halftone could emphasize details in the image, while another could be best for smooth transitions. Thus, print condition 304 includes halftone 306A and halftone 306B. For example, halftone 306A may correspond to the halftone design to emphasize details in the image being printed. Halftone 306B may correspond to the halftone design to provide for smooth transitions.

For each halftone, the print shop should capture the desired per-colorant behavior over all shades of that colorant. By behavior, the disclosed embodiments refer to the color measurement. The record of these colorant behaviors, and the information that allows printing device 104 to be adjusted back to such behaviors, are stored as calibration data. These adjustments may vary linearly or with a curve. The calibration data include characteristics of each ink under the halftone selected. Thus, halftone 306A includes calibration data 308A and halftone 306B includes calibration data 308B.

Further, with a selected halftone, and the calibration data enforced to produce desired behavior of each colorant, the disclosed embodiments then create an ICC profile to fully characterize how ink combinations relate to standardized color measurements, as disclosed above. It is via the ICC profile that, for the specific paper-halftone-calibration-data set up, printing device 104 can reproduce the colors, text, and parameters of the original document. The process for generating an ICC profile is disclosed above. Thus, halftone 306A includes ICC profile 310A and halftone 306B includes ICC profile 310B.

Often printing systems have additional "dials" for more customized controls. For instance, there are settings of total ink amounts allowed in the ICC profile for preserving the glossy finish of a paper. Alternatively, it could be a very conservative expectation of the black ink response set into the calibration data. These more specific customizations may be identified as print conditions. In the scheme of the aforementioned items affecting color management, the disclosed embodiments place print conditions at the highest tier under each paper type, as shown in FIG. 3 by print condition 304.

Paper type 302 along with print condition 304 and halftones 306A and 306B may refer to the print management resources and items for one paper type. In a print shop, for each model of printing device 104, there may be dozens or more paper types in use. To keep track of the print management items for all these papers, paper catalog 124 may be implemented in system 100. As disclosed above, paper catalog 124 may be a software data storage system that archives all the color management items and resources for each paper type in use. When a print job is specified on a particular paper, identified as paper type identification 303, under a chosen print condition 302 employing halftone 306A, paper catalog 124 will provide the proper corresponding calibration data 308A and ICC profile 310A for printing device 104 to use. If the print job specifies print condition 302 employing halftone 306B, then paper catalog 124 will provide calibration data 308B and ICC profile 310B for printing device 104 to use for the print job.

The entry for paper type 302 also may include dimensions 310, such as length and width of a sheet of the paper type. Dimensions 310 may be a standard size of paper or a non-standard size. Paper type 302 also may include one or more attributes for the paper. For example, first attribute 312 may be the weight of a sheet of paper type 302. First attribute 312 may be 120 grams per square meter (gsm). Heavier paper is reflected by a higher number for gsm. Generally, heavier paper is associated with a higher quality of stock. It should be noted that dimensions 310 may also be considered an attribute of paper type 302. Further, first attribute 312 may be considered a dimension of paper type 302.

Paper type 302 also may include second attribute 314 and third attribute 316. These attributes may pertain some other feature of the paper of paper type 302 aside from dimensions and weight. Second attribute 314 may refer to the color of the paper for paper type 302, such as white, blue, yellow, and the like. Third attribute 316 may refer to a feature of the paper of paper type 302, such as recycled, new, and the like. Other potential attributes may be glossy or matte paper.

Dimensions and attributes within paper catalog 124 may not necessarily match the attributes for paper trays 108, 110, and 112. Paper trays 108, 110, and 112 also may have attributes that apply to print job 103 as specified by print ticket 126. Dimensions 310 may be included in print ticket 126. Dimensions 310 also may apply to a parameter within paper catalog 124 and paper trays 108, 110, and 112. The other attributes, however, within paper catalog 124 may not apply to any attribute for paper trays 108, 110, and 112.

Figure 4:
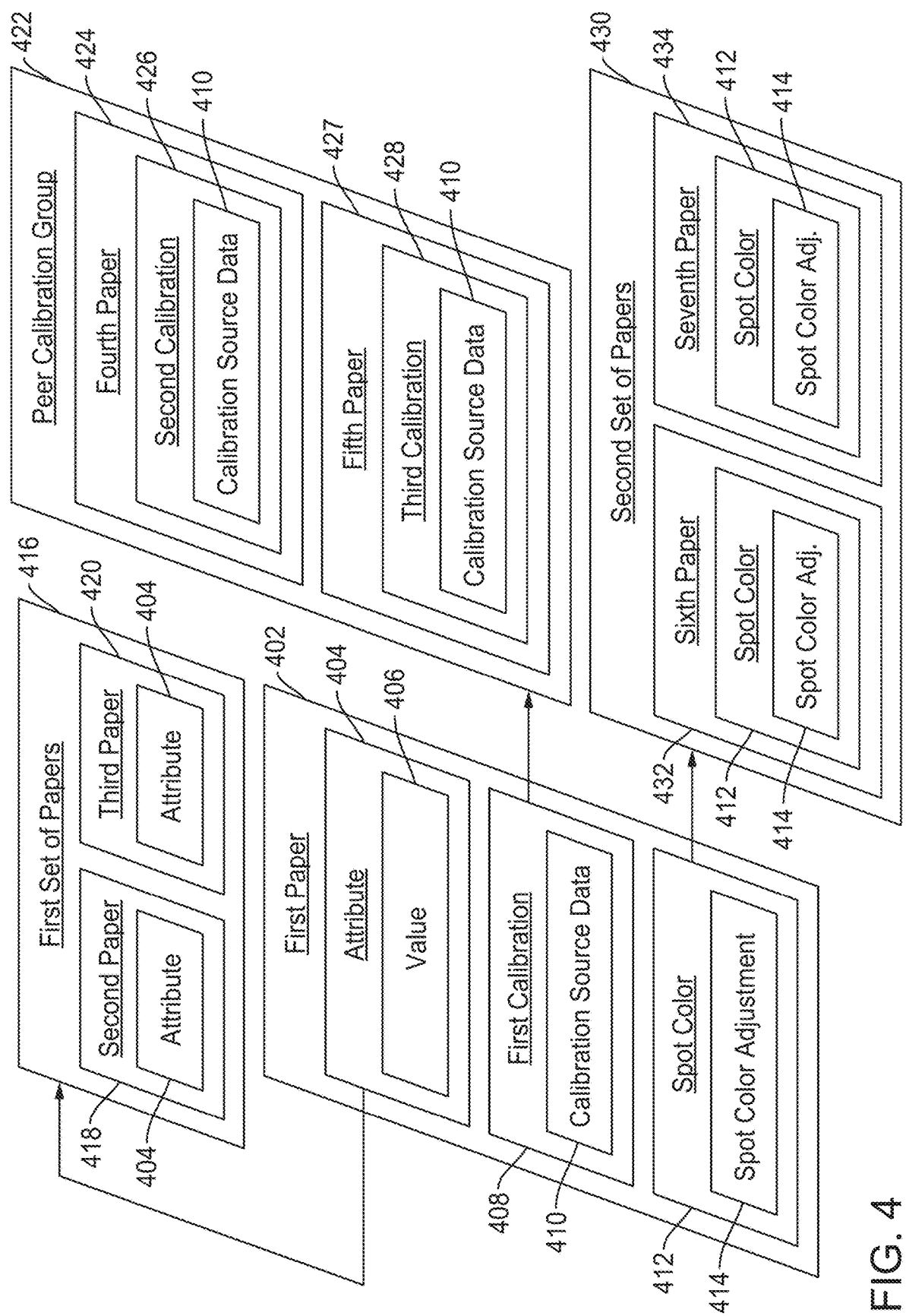
FIG. 4 illustrates a block diagram of aggregated sets of papers based on an attribute or a resource of a first paper according to the disclosed embodiments.

FIG. 4 depicts a block diagram of aggregated sets of papers based on an attribute 404 or a resource of a first paper 402 according to the disclosed embodiments. The disclosed embodiments allow for the export or import of integrated resources. When a resource is exported, such as from paper catalog 124, all linked resources also are exported or imported. An operator would not need to manage the correlation between resources as it is done automatically by DFE 106, which includes many of the resources and paper catalog 124 for a printing device. The embodiments disclosed below may refer only to exporting resources or data from printing device 104 but these same embodiments may be used to import resources or data to printing device 104.

When an operator chooses to export or import a resource of a given type, DFE 106 may determine whether any aggregation of papers within paper catalog 124 makes sense. The aggregations may be generated based on a resource used to print a first paper 402. First paper 402 may refer to a paper catalog entry 302 in paper catalog 124 for a paper or media type available for printing at printing device 104. First paper 402 may be loaded as paper 114, 116, or 118 at printing device 104. Alternatively, first paper 402 may not be loaded at all.

First paper 402 may include attributes or resources set forth in its paper catalog entry 302. For brevity, attribute 404 is shown in FIG. 4. Attribute 404 may refer to dimensions 310, first attribute 312, second attribute 314, or third attribute 316 for a paper catalog entry 302 corresponding to first paper 402. Any of these attributes may be used as attribute 404 by DFE 106 to generate first set of papers 416. Further, attribute 404 may include a value 406 that specifies a feature of the attribute. Examples of attributes and values are disclosed in greater detail below. First set of papers 416 is generated from the plurality of paper catalog entries 302 within paper catalog 124.

For example, first set of papers 416 may include second paper 418 and third paper 420. Second paper 418 and third paper 420 correspond to paper catalog entries 302 in paper catalog 124 for different papers that have attribute 404 of first paper 402. More than one attribute 404 for first paper 402 may be used in generating first set of papers 416. For example, if attribute 402 is paper size, or dimensions, then second paper 418 and third paper 420 include attribute 402 as having the same paper size as first paper 402. If first set of papers 416 is exported, then those papers having the same size as first paper 402 also will be exported.

These features may be disclosed in greater detail by FIGS. 5A and 5B. FIG. 5A depicts an example listing of attributes 502 for a specific paper, or first paper 402, according to the disclosed embodiments. FIG. 5B depicts an example listing of paper group attributes for a set of papers generated according to the disclosed embodiments. Attributes 502 of FIG. 5A refer to attribute 404 in FIG. 4. For example, attribute 404 may be any one of attributes 502 for first paper 402. Attributes 502 may be listed in paper catalog entry 302 for first paper 402, or may be a file associated with first paper 402. FIG. 5A may show how attributes 502 are displayed for first paper 402 in user interface 120. For example, an operator may click on an entry for first paper 402 within user interface 120 to display its attributes 502.

Name attribute 504 may refer to the name given for first paper 402 in paper catalog 124, at printing device 104, or within printing system 100. Value 506 may be a field with the name, such as First Paper for first paper 402. External identification attribute 508 may refer to an external identification number or code for the paper. Value 510 may be a field with the code. Here, the code may be 62e26558-a3e9. Brand attribute 512 may be the brand name for first paper 402. Many paper manufacturers have their own names for their papers. For example, Big Print Company may make first paper 402 with a brand name of Big Print Color Copy. Thus, value 514 may be a field having Big Print Color Copy.

Size attribute 516 may refer to the size of the paper. Size attribute 516 may correspond to dimensions 310 in paper catalog entry 302. Value 518 may be A4, which is a common reference to a paper size used in printing operations. Other data for value 518 may be letter, legal, A3, or A5. Value 518 also may include the actual dimensions, or 210 mm by 297 mm.

Feed direction attribute 520 may refer to the direction that first paper 402 is fed within printing device 104. Value 522 may include long edge as the feed direction. Weight attribute 524 may refer to the weight of first paper 402. Value 526 may be the weight in grams per square meter, or gsm. Here, value 526 is 170 gsm. Grain attribute 528 may refer to the grain used by first paper 402. Value 530 may be, for example, long for a long grain.

Type attribute 532 may refer to the paper type for first paper 402. Value 534, for example, may be plain in that first paper 402 is a plain type. Set count attribute 536 may refer to the set count used for first paper 402. Value 538, for example, may be 1. Color attribute 540 may refer to the color of first paper 402. Value 542, for example, may be white in that first paper 402 is white.

Front coating attribute 544 may refer to the coating status of the front of first paper 402. Value 546, for example, may be inkjet, as opposed to toner or laser, to indicate that first paper 402 is to be used in inkjet printing devices. Back coating attribute 548 may refer to the coating status of the back of first paper 402. Value 550, for example, also may be inkjet. Texture attribute 552 may refer to the texture, or feel, of first paper 402. Value 554, for example, may be smooth to indicate that first paper 402 has a smooth texture. Preprinted attribute 556 may refer to whether first paper 402 is preprinted before being loaded onto printing device 104. Value 558, for example, is no.

Paper group name 560 may refer to a paper group that includes first paper 402. The paper group may be generated using one or more attributes 502 in papers within paper catalog 124. Not every paper within the paper group may have all the attributes of first paper 402. Here, value 562 for the paper group name may be coated glossy. The coated glossy paper group may be made available to the operator via user interface 120 for selection to export or import. If first paper 402 is selected to export, then the disclosed embodiments also provide first set of papers 416, or coated glossy, for selection to export. In some embodiments paper group name 560 may be an attribute.

FIG. 5B depicts an example of a first set of papers 416 as a paper group having paper group name 560. This information may be shown as paper group attributes 570 for first set of papers 416 displayed to the operator in user interface 120 if first set of papers 416 is selected or click on in the interface to display more information. Paper group attributes 570 include attributes corresponding to attributes 502 for first paper 402. Paper group attributes 570, however, does not include all attributes 502 as the paper group preferably includes a plurality of papers.

Paper group attributes 570 includes paper group name 560 which has a value 562 of coated glossy. Paper group name 560 may be highlighted or emphasized when paper group attributes 570 are displayed within user interface 120. Paper group attributes 570 also include brand attribute 512 having a value 514 of Big Print Color Copy. Thus, papers having the same brand attribute 512 are listed in first set of papers 416. The number of papers in first set of papers 416 is defined further by the remaining attributes.

Type attribute 532 may be included and having a value 534 of plain such that plain paper of brand attribute 512 is within first set of papers 416. Set count attribute 536 has a value 538 of 1 to further define the papers within first set of papers 416. Color attribute 540 also may be specified as having a value 542 of white so that white papers are included. Front coating attribute 544 has a value 546 of inkjet. Back coating attribute 548 has a value 550 also of inkjet. Texture attribute 552 may be specified as having a value 554 of smooth. Preprinted attribute 556 may have a value 558 of no. All papers within first set of papers 416 have these attributes, as set forth in their paper catalog entries or in data provided with the papers as they are entered within printing system 100.

Using the above attributes and values, first set of papers 416 may include papers within paper catalog 124 that are of the Big Print Color Copy brand, plain type, a set count of 1, a white color, front and back coating for inkjet, a smooth texture, and not preprinted. Other attributes are not included in paper group attributes 570 in that the papers in first set of papers 416 do not necessarily have those attributes or values. For example, papers within first set of papers 416 with paper group attributes 570 may have any weight.

It should be noted that the values disclosed above are examples of the type of data included for to differentiate the data for the attributes. Other data values may used for the attributes but are not listed here due to brevity. Further, the attributes may be changed for first paper 402, which then causes other papers to be updated based on aggregations disclosed herein. The papers in the groups or sets are the papers that use the same values for attributes that impact printing reproduction, especially color reproduction.

Referring back to FIG. 4, other aggregations may take place beyond just first set of papers 416. For example, the disclosed embodiments may form a peer calibration group 422. Here, DFE 106 may mirror the aggregation used to manage calibrations and display a single entry for each peer calibration group. A peer calibration group is created for a set of papers that have calibrations using the same source calibration data, or calibrations that were printed using the same values for attributes that affect calibration curves, such as media and halftone.

First paper 402 may have a first calibration 408 associated with it in paper catalog 124. Other calibrations may be associated with first paper 402 but not shown here for brevity. First calibration 408 is generated using calibration source data 410. A calibration operation is performed at printing device 104 using calibration source data 410 to perform the calibration and generate the resources related to printing first paper 402 having certain print attributes, such as halftone or print condition. The operator may select first calibration 408 of first paper 402 to be exported.

In response, the disclosed embodiments also aggregate the papers in peer calibration group 422 for possible selection to export. Peer calibration group 422 includes a plurality of papers, including first paper 402. It also includes fourth paper 424. Fourth paper 424 is associated with a second calibration 426 according to paper catalog 124. Second calibration 426 also uses calibration source data 410. Peer calibration group 422 also includes fifth paper 427, which is associated with third calibration 428 according to paper catalog 124. Third calibration 428 also uses calibration source data 410.

Thus, peer calibration group 422 may be added to a list of items for export along with first calibration 408. It should be noted that first paper 402 may be in several peer calibration groups as it is associated with multiple calibrations within paper catalog 124. Different calibration source data may be used for the different calibrations and used in different peer calibration groups.

The disclosed embodiments also mirror aggregation used to manage spot colors to display aggregated spot color definitions and adjustments. Thus, second set of papers 430 may be generated. If the operator wishes to export spot color 412 used by first paper 402, then second set of papers may be created from those papers also using spot color 412. Further, spot color 412 may include a spot color adjustment 414 that is also part of the colors resource being exported.

Based on spot color 412, DFE 106 may identify a set of papers to populate second set of papers 430. For example, sixth paper 432 of paper catalog 124 may include spot color 412, like first paper 402. Sixth paper 432 also may incorporate spot color adjustment 414, if applicable. Seventh paper 434 of paper catalog 124 also may include spot color 412 and is, therefore, added to second set of papers 430.

Depending on the resource of first paper 402 to be exported, paper groups are generated to provide further information for the operator to select to export. For example, the operator may want all papers that can meet the requirements for printing, such attributes, calibrations, or spot colors. In some embodiments, if first paper 402 is selected for export, then the disclosed embodiments may aggregate different sets of papers to provide options for exporting resources. The resource, such as paper catalog entry, attribute, calibration, or spot color may be highlighted to let the operator know what is being used to form the set of papers.

Figure 6:
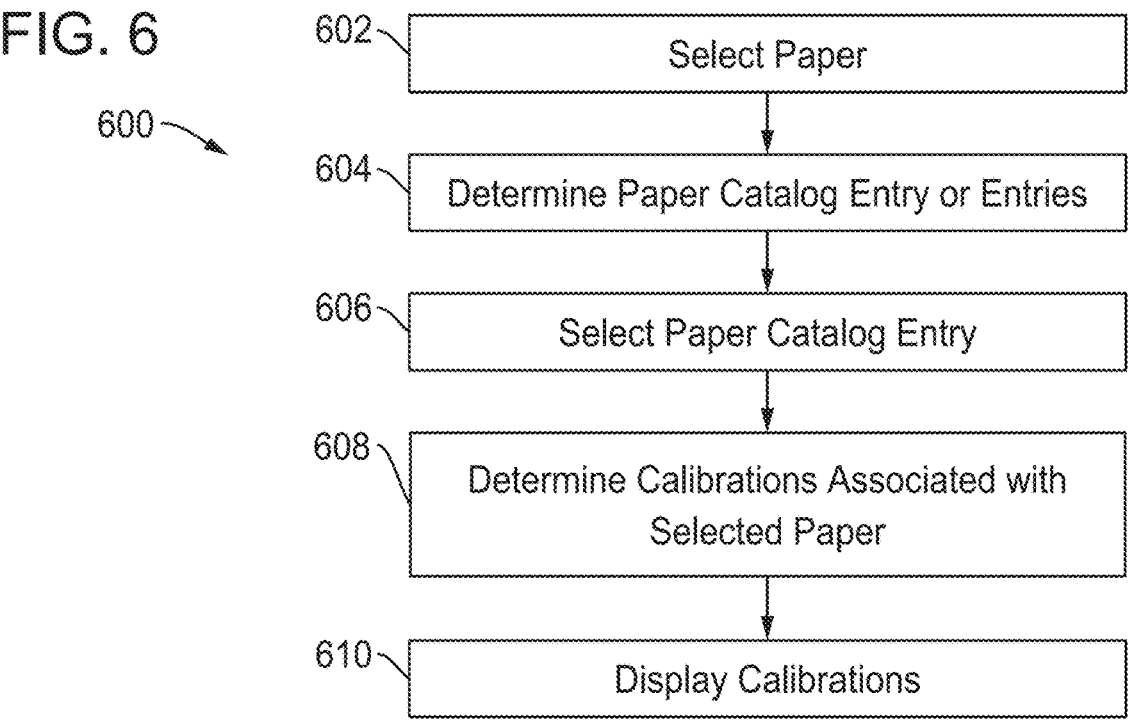
FIG. 6 illustrates a flowchart for aggregating related resources based on a paper catalog entry according to the disclosed embodiments.

FIG. 6 depicts a flowchart 600 for aggregating related resources based on a paper catalog entry 302 according to the disclosed embodiments. Flowchart 600 may refer to FIGS. 1A-5 for illustrative purposes. Flowchart 600, however, is not limited to the embodiments disclosed by FIGS. 1A-5.

Step 602 executes by selecting a paper, such as first paper 402, from the plurality of papers available to print on printing device 104 or within printing system 100 to export or import. Step 604 executes by determining a paper catalog entry 302 for first paper 402. In some embodiments, there may be multiple paper catalog entries 302 for first paper 402. Step 606 executes by selecting the paper catalog entry 302 for first paper 402 to export or import within printing system 100. The operator may review paper catalog 124 and select paper catalog entry 302 for first paper 402.

Step 608 executes by determining calibrations that are associated with paper catalog entry 302 and first paper 402. For example, paper catalog entry 302 may include first calibration 408 along with additional calibrations. Referring to FIG. 3, paper catalog entry 302 includes calibration data 308A and 308B, so that there may be two calibrations to associate with first paper 402. Step 610 executes by displaying the calibrations 308A and 308B with paper catalog entry 302 along with first paper 402 and the paper catalog entry. This feature allows the operator to see which calibrations will be exported or imported along with paper definitions. In other words, the operator may view what resources are being exported for first paper 402 based on its paper catalog entry 302.

Figure 7:
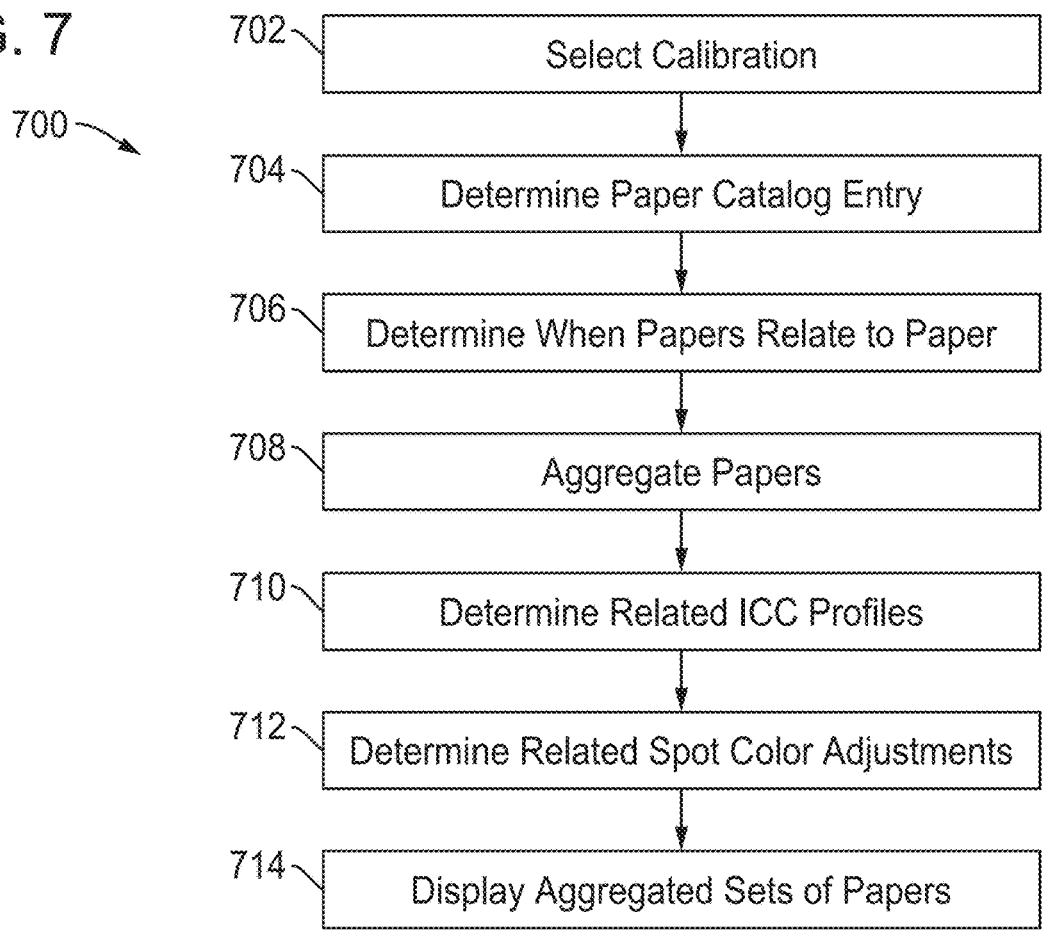
FIG. 7 illustrates a flowchart for aggregating related resources based on a calibration according to the disclosed embodiments.

FIG. 7 depicts a flowchart 700 for aggregating related resources based on a calibration according to the disclosed embodiments. Flowchart 700 may refer to FIGS. 1A-6 for illustrative purposes. Flowchart 700, however, is not limited to the embodiments disclosed by FIGS. 1A-6.

Step 702 executes by selecting a calibration to export or import within printing system 100. For example, the operator may select first calibration 408 of first paper 402. Further, for example, first calibration 408 may correspond to calibration data 308A within paper catalog entry 302. Thus, the calibration is associated with a paper catalog entry 302 within paper catalog 124. Step 704 executes by determining which paper catalog entry 302 was used to create the calibration.

Step 706 executes by determining which papers relate to the calibrated paper. For example, first paper 402 is the calibrated paper for first calibration 408. The disclosed embodiments determine the papers related to first paper 402. In some embodiments, groups or sets of papers may be generated based on attributes in common with first paper 402, as disclosed above. For example, one or more attributes may be selected to define the groups or sets of papers. Step 708 executes by aggregating the papers related to first paper 402 based on its paper catalog entry 302 to form one or more groups or sets of papers.

Step 710 executes by determining related ICC profiles that are associated with the calibration. For example, first calibration 408 also may be calibration 308A in paper catalog entry 302 for first paper 402. ICC profile 310A is related to calibration 308A. The disclosed embodiments will determine ICC profile 310 should be grouped with the other resources and information for export or import. If the calibration being exported or imported is calibration 308B, then the disclosed embodiments would identify ICC profile 310B for being grouped with the aggregated papers.

Step 712 executes by determining one or more spot color adjustments that are associated with the selected calibration. For example, spot color 412 and spot color adjustment 414 may be associated with first calibration 408. Preferably, this fact is shown within paper catalog entry 302 for first paper 402. The disclosed embodiments will determine which base spot color definition and spot color aliases for spot color 412 should be aggregated along with spot color adjustment 414. For example, spot color 412 may relate to other data entries within printing device 104 for the defined color and the disclosed embodiments wants to make sure to aggregate these with spot color 412.

It is noted that step 712 may be executed as its own process. In other words, spot color 412 may be selected as the resource to be exported or imported. First calibration 408 may not be used to determine spot color 412. If so, then step 712 executes as its own process to aggregate spot colors and resources. For example, the disclosed embodiments will look for spot color aliases and spot color adjustments 414 that are associated with the selected spot color 412. The aggregated spot colors may be displayed in step 714 below.

Step 714 executes by displaying the aggregated groups or sets of papers, ICC profiles, and spot colors and spot color adjustments within user interface 120. The operator may review the related color printing resources associated with the selected calibration for export or import within printing system 100.

FIG. 8 depicts a flowchart 800 for aggregating related resources based on an ICC profile according to the disclosed embodiments. Flowchart 800 may refer to FIGS. 1A-7 for illustrative purposes. Flowchart 800, however, is not limited to the embodiments disclosed by FIGS. 1A-7.

Step 802 executes by selecting an ICC profile to export or import. For example, ICC profile 310A may be selected. Paper catalog entry 302 having ICC profile 310A may be associated with first paper 402. Step 804 executes by determining the calibration used to create the selected ICC profile. For example, the disclosed embodiments determine that calibration 308A is used to generate ICC profile 310A.

Step 806 executes by determining that the calibration used to create the ICC profile is part of a peer calibration group. For example, calibration 308A corresponds to first calibration 408. First calibration 408 is part of peer calibration group 422, which uses calibration source data 410 for at least one calibration for a set of papers aggregated within the group. First calibration 408 for first paper 402 means that the first paper is within peer calibration group 422 along with fourth paper 424 and fifth paper 427.

Step 808 executes by aggregating the papers within the peer calibration group. In some embodiments, papers within the peer calibration group may be further defined using one or more attributes of first paper 402 to form sub-sets of papers within peer calibration group 422. Step 810 executes by displaying the peer calibration group within user interface 120 along with the selected ICC profile. The operator may wish to export or import the color printing resources for the papers aggregated within peer calibration group 422. The disclosed embodiments automatically define these groups and provides them to the operator based on the selected calibration or ICC profile.

FIG. 9 depicts a flowchart 900 for aggregating resources according to the disclosed embodiments. Flowchart 900 may refer to FIGS. 1A-8 for illustrative purposes. Flowchart 900, however, is not limited to the embodiments disclosed by FIGS. 1A-8. The disclosed embodiments may crawl through resources to provide the operator with a complete set of resources. For example, the operator may export or import paper catalog 124.

Step 902 executes by selecting paper catalog 124 to export to or import from printing device 104. Step 904 executes by aggregating paper catalog entries 302 within paper catalog 124. The multiple paper catalog entries 302 may be treated as a single aggregated entry. Step 906 executes by determining calibrated paper catalog entries. Each paper catalog entry 302 may be analyzed to identify those that have calibrations associated with them. For example, if first paper 402 is associated with paper catalog entry 302 of FIG. 3, then it may be determined that first paper 402 has calibration 308A and calibration 308B associated with the entry.

Step 908 executes by aggregating all calibrations within the paper catalog entry for each calibrated paper. For example, calibrations 308A and 308B may be aggregated for first paper 402. Additional calibrations associated with paper catalog entry 302 for first paper 402 also may be aggregated.

Step 910 executes by determining associated peer calibration groups for the aggregated calibrations. Peer calibration groups are disclosed above. For example, peer calibration group 422 may be aggregated around calibration source data 410 such that papers having calibrations using the same calibration source data will be added to the group. There may be multiple peer calibration groups 422 for a given paper catalog entry 302 as the paper may include multiple calibrations. For example, referring to FIG. 3, paper catalog entry 302 include calibration 308A and 308B. Separate peer calibrations groups may be formed each calibration as they use different calibration source data. Thus, first paper 402 may be aggregated in two or more peer calibration groups.

Step 912 executes by aggregating ICC profiles created for any of the calibrations within the paper catalog entry. The disclosed embodiments determine if an ICC profile has been created for any of the calibrations. For example, referring to FIG. 3, if paper catalog entry 302 or first paper 402 is aggregated with the entry for paper catalog 124, then ICC profile 310A and ICC profile 310B will be aggregated with the other resources for export or import.

Step 914 executes by determining spot color adjustments associated with any of the calibrations aggregated above. For example, spot color 412 may be associated with calibration 308A of paper catalog entry 302 for first paper 402. If so, then the disclosed embodiments in step 916 will aggregate the spot color including the base spot color definition and spot color aliases associated with a spot color adjustment 414 for spot color 412. Further, the disclosed embodiments may export or import spot color adjustments that are associated with paper catalog entries other than selected paper catalog entry 302.

Step 918 executes by identifying additional resources that may be aggregated or added to the information provided to the operator. For example, if spot color adjustments 414 for spot colors 412 are exported, then the disclosed embodiments will crawl back through the resources in paper catalog 124 to aggregated those paper catalog entries, calibrations, and the like.

In some embodiments, the operator may select calibrations to export or import instead of paper catalog entries. If so, then the disclosed embodiments may execute the processes of flowchart 900 as disclosed above, except starting with each calibration instead of with a paper catalog entry 302. In this instance, however, the source resource is the calibration. Thus, step 904 is performed after selecting the calibration in that paper catalog entries 302 are aggregated based on the calibration. From there, the aggregated paper catalog entries form their own group.

Step 920 executes by displaying the entries generated above for paper catalog 124 and the aggregated groups and resources to the operator. The entries may be displayed within user interface 120. The aggregated entries may look like below:

| Paper Groups | |
|---|---|
| 1. | Undefined—Paper Group Name |
| 1A. | weight—thickness—size (grain)—[attributes of the paper group] |
| 2. | First Brand—Paper Group Name |
| 2A. | weight—size (grain) [no defined thickness] |
| 2B. | weight—thickness—size (grain) [calibrated size, these sizes are calibrated] |
| 2Bi. | calibration name—halftone |
| 3. | Second Brand—Paper Group Name |
| 3A. | weight—thickness—size (grain) [calibrated size] |
| 3Ai. | calibration name—halftone—print condition |
| 3Aia. | ICC profile name [this paper's ICC profile for this calibration] |
| 3B. | weight—thickness—size (grain) [calibrated size with spot color adjustment] |
| 3Bi | calibration name—halftone—print condition |
| 3Bia. | ICC profile name [this paper's ICC profile for this calibration] |
| 3Bib. | Spot color name [spot color adjustment assigned to this paper/calibration] |

As can be appreciated, many paper groups and aggregated resources may be displayed.

Step 922 executes by selecting resources to export or import. The operator may select which resources (paper catalog entries, calibrations, spot colors, ICC profiles) to export or import. The disclosed embodiments will automatically link all resources using the above displayed tree. Alternatively, the operator may be given the option to not export or import the linked resources. For example, the operator may remove resources as desired. Step 924 executes by storing the resources selected in a file that may be exported or imported at a later time. The file may be stored within DFE 106 of printing device 104. Alternatively, the file may be stored at a linked device to printing device 104. The operator may send the file from DFE 106 to the desired location.

With regard to importing resources, the same actions may be taken as disclosed above in terms of aggregated resources for selection. When resources are imported, the disclosed embodiments may import resources based on the dependencies to ensure all dependent resources are imported. The disclosed embodiments will provide import status for all resource types. The operator may be given the option to choose which resources to import into printing system 100. This feature may be at the top level or at every level of the resource tree. Imported resources retain the original associations to ensure that these resources are used in the same manner in printing device 104 or printing system 100 as they are used in the source printing device or system.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for managing color printing resources, the method comprising:
   selecting a resource of an identified paper within a paper catalog;
   aggregating a set of papers within the paper catalog for the printing device based on a shared attribute of the identified paper;
   displaying a list including the set of papers along with the shared attribute; and
   selecting the set of papers from the list to export from or import to the printing device.

2. The method of claim 1, further comprising determining linked resources for the set of papers selected from the list.

3. The method of claim 2, further comprising storing the linked resources and the resource of the identified paper in a file.

4. The method of claim 1, further comprising analyzing resources applicable to the printing device to determine if the set of papers have been calibrated for a paper catalog entry.

5. The method of claim 4, further comprising aggregating a plurality of calibrations for the paper catalog entry.

6. The method of claim 5, further comprising determining whether at least one ICC profile is associated with at least one of the plurality of calibrations.

7. The method of claim 6, further comprising displaying the at least one ICC profile with the at least one of the plurality of calibrations and the paper catalog entry.

8. The method of claim 1, wherein the attribute corresponds to color reproduction at the printing device.

9. A method for managing color printing resources in a printing system, the method comprising:
- selecting a resource for color printing at a printing device;
- aggregating a set of papers within the paper catalog for the printing device based on a shared attribute of the resource;
- determining a first calibration associated with the set of papers along with a paper catalog entry used to create the first calibration;
- generating a first peer calibration group based on papers within the set of papers using the first calibration;
- displaying the first peer calibration group including the papers using the first calibration; and
- selecting the first peer calibration group for export from or import to the printing device.

10. The method of claim 9, further comprising determining an ICC profile associated with the first calibration.

11. The method of claim 9, further comprising determining a spot color adjustment associated with the first calibration.

12. The method of claim 11, further comprising determining a base spot color definition or a spot color alias related to the spot color adjustment.

13. The method of claim 9, further comprising exporting the first peer calibration group from the printing device.

14. The method of claim 9, further comprising importing the first peer calibration group to the printing device.

15. The method of claim 9, further comprising generating a second peer calibration group including papers of the set of papers using a second calibration.

16. The method of claim 15, further comprising displaying the second peer calibration group including the papers using the second calibration separate from the first peer calibration group.

17. A method for exporting color printing resources for a set of papers, the method comprising:
- selecting a first calibration to export, wherein the first calibration corresponds to a paper within a paper catalog for a printing device;
- aggregating a set of papers within the paper catalog for the printing device based on a shared attribute of the paper corresponding to the first calibration;
- generating a first peer calibration group based on papers within the set of papers having the shared attribute;
- determining an ICC profile associated with the first calibration;
- determining a spot color adjustment associated with the first calibration;
- displaying the first peer calibration group, the ICC profile, the spot color adjustment, and the first calibration; and
- selecting at least one resource to export from the first peer calibration group.

18. The method of claim 17, further comprising exporting the at least one resource along with linked resources within the first peer calibration group.

19. The method of claim 17, further comprising a second calibration to export, wherein the second calibration corresponds to another paper within the paper catalog for the printing device.

20. The method of claim 19, further comprising
- aggregating another set of papers within the paper catalog for the printing device based on a shared attribute of the another paper corresponding to the second calibration; and generating a second peer calibration group based on papers within the another set of papers having the shared attribute.

* * * * *